United States Patent
Eriksson (12)

(10) Patent No.: US 6,490,272 B1
(45) Date of Patent: Dec. 3, 2002

(54) RADIO LINK NETWORK AND A METHOD FOR TRANSFERRING ADDITIONAL SERVICES IN A RADIO LINK NETWORK

(75) Inventor: Karl Örjan Eriksson, Askim (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/158,520

(22) Filed: Nov. 29, 1993

(30) Foreign Application Priority Data

Nov. 30, 1992 (SE) .............................................. 9203608

(51) Int. Cl.[7] .................................................. H04J 3/16
(52) U.S. Cl. ........................ 370/349; 370/259; 370/315; 370/389; 370/458
(58) Field of Search ........................ 370/95.3, 60, 94.1, 370/61, 84, 62, 63, 58.2, 60.1, 94.3, 110.1, 458, 389, 394, 428, 232, 349, 259, 260, 370, 315, 352, 522; 379/63, 58; 375/3; 455/33.1, 54.1, 54.2

(56) References Cited

U.S. PATENT DOCUMENTS

| | | | | |
|---|---|---|---|---|
| 4,004,224 A | * | 1/1977 | Arens et al. .................... 375/3 |
| 4,887,265 A | | 12/1989 | Felix .......................... 370/94.1 |
| 4,893,307 A | * | 1/1990 | McKay et al. ............. 370/94.1 |
| 5,123,014 A | | 6/1992 | Federkins et al. ........ 370/110.1 |
| 5,218,602 A | * | 6/1993 | Grant et al. ............... 370/94.3 |
| 5,231,635 A | * | 7/1993 | Travers et al. ............. 370/95.3 |
| 5,274,694 A | * | 12/1993 | Lechner et al. ............... 379/63 |
| 5,278,835 A | * | 1/1994 | Ito et al. ..................... 370/95.3 |
| 5,282,204 A | * | 1/1994 | Shpancer et al. .......... 370/95.1 |
| 5,317,633 A | * | 5/1994 | Hiraiwa ...................... 370/60.1 |

FOREIGN PATENT DOCUMENTS

| | | | |
|---|---|---|---|
| DE | 36110542 | 9/1982 | ............ H04K/3/00 |
| EP | 246 619 | 11/1987 | |
| WO | 91/08629 | 6/1991 | ............ H04B/7/24 |

OTHER PUBLICATIONS

PTR Philips Telecommunication Review, vol. 49, No. 3, Sep. 1991, Hilversum, NL, A. Blanchard "The DRL Family: A digital Microwave Radio System for Regional and Local Networks", p. 6, line 2, table 1.

Electrical Communication, vol. 65, No. 1, 1991, Romford, GB, pp. 83–86, XP264673. "Rural Communication", p. 84.

Globecom 1991, vol. 2, Dec. 1991, Phoenix, U.S., pp. 25B1.1–25B.1.5, XP332795 C. Carlisle et al., Architectures and Functional Aspects of Radio Relay Systems for SDH Networks, p. 25B.1.3.

* cited by examiner

*Primary Examiner*—Douglas Olms
*Assistant Examiner*—Shick Hom

(57) ABSTRACT

A radio link network and a method for transferring, in addition to commercial traffic, other traffic as information from a number of additional services. The radio link network comprises several radio link stations and the information is transferred in a number of channels (2). The information from the additional services is transferred in a common channel. (3) adapted to transfer different types of additional services (4, 5, 6). The information transferred in the common channel between a starting point and an ending point is not terminated in intermediate radio link stations.

9 Claims, 1 Drawing Sheet

RADIO LINK NETWORK AND A METHOD FOR TRANSFERRING ADDITIONAL SERVICES IN A RADIO LINK NETWORK

BACKGROUND

The present invention relates to a method for transferring additional services in a radio link network.

The present invention also relates to a radio link network for transferring additional services.

Radio links are nowadays a common method for transfer of telephony and data information. Radio links are often connected so that complete transmission networks with several integral links are created. The traffic originates for example from an exchange and the radio link network distributes the telephony traffic towards the subscribers in a successively more closely meshed network of links. Other common applications are mobile telephony where the radio link is used for distribution to remote or inaccessibly situated base stations (e.g. high terrain areas or urban areas where it is difficult and expensive to use existing ground communication). When an operator chooses to use a radio link for his commercial traffic transmission needs (e.g. data and telephony between the subscribers of the operator), he also has a need to transfer additional services, that is information connected with e.g. operational support for the equipment or service and data channels for communication between his own facilities.

The reason for not including these additional services in the regular commercial traffic is that a standard for how this type of information shall be included is often lacking and that the equipment that would be needed in every radio link terminal to separate the commercial traffic and the additional services is too expensive. The consequence of this is that all modern radio links include separate channels for transfer of additional information, normally 1–3 extra voice/data channels and channels for transfer of operational support information such as alarms and other supervising information.

In present day radio link systems there are terminals in each end of a radio link hop. On each radio link terminal there are connectors for connection of service channels (e.g. telephony), data channels and supervising equipment. In addition to these terminating points there are also connectors for commercial traffic and power supply. In the terminals there is also space for the terminating units which shall physically and electrically adapt the additional services to the transport system/radio link.

If the radio link hops are located close to each other forming chains or networks, the additional services must be connected by separate cabling between the radio link terminals in order to be able to distribute the information to the next radio link hop.

The presently used radio link systems have a number of drawbacks:

In all radio link terminals the additional services must be terminated in order to be transferred to the next radio link terminal via separate cabling even at places where the services are not used. This means an increased cost for the complete system.

The cabling becomes complex as all services need separate wires between the radio link terminals. Often the information will be distributed to several terminals which makes the installation work more complex and increases the risk for cabling mistakes.

In an installed radio link network it is difficult to incorporate new services as both the radio link terminals and the cabling there between have to be changed.

In spite of the drawbacks all known radio links use this method to transfer, terminate and distribute additional services.

For transfer of the additional services (and commercial traffic) over the radio link hop, time or frequency division is used so that the information from each additional service occupies one separate channel. If, as an example, a number of service channels for voice or data information are to be transferred, each channel is assigned its own fixed time slot in the flow of information between the radio link terminals. Alternatively they can be frequency modulated "on" the commercial traffic. This system involves among other things the following drawbacks:

In order to avoid supplementary modifications to the radio link stations, each radio link station is equipped with one or several channels for additional services whether they are used in a certain application or not. This results in an unnecessarily expensive and complex product.

The fixed channel division of the transport system often results in the available channels having insufficient capacity or are of the wrong type.

Certain types of additional services, for example data and operational support information, are of a non-continuous type, i.e. the information arrives intermittently. However, the interruptions in the information can not be used because every service uses a separate, permanently assigned channel.

The object of the present invention is therefore to provide a transfer of various numbers and types of additional services in a radio link network without the need to increase the normal equipment of the radio link terminals. With this invention, the cabling between the terminals can also be simplified and it is not necessary to change it even if the number of additional services is increased. In addition, the invention implies that the available time and/or frequency range in the radio link system is used in a more efficient way.

SUMMARY

Said object is achieved by a method according to the present invention, by which, in a radio link network in which information is transferred in a plurality of channels and which comprises a plurality of radio link stations, other traffic in the form of information from a number of additional services is transferred. Information from additional services is transferred in a common channel which can transfer information from various types of additional services, and the information from the additional services is transferred in the common channel between a starting point and an ending point without being terminated in a radio link station intermediate between the starting and ending points.

Said object is also achieved by a radio link system according to the present invention, comprising a plurality of radio link stations in which, in addition to regular commercial traffic, other traffic in the form of information from a number of additional services is transferred. The radio link stations include a terminating unit, at a starting point for a respective additional service, for physically and electrically adapting the information from the additional service to the radio link network and for splitting that information into packets; a controller for bringing packets from various additional services together in a common channel arranged in each radio link station, the common channel being for transferring information from various types of additional services; and a terminating unit, at an ending point for a respective additional service, for converting the information to a predetermined physical and electrical format.

BRIEF DESCRIPTION OF THE DRAWINGS

The invention will now be described by way of an example of an embodiment and with reference to the accompanying drawings in which.

DETAILED DESCRIPTION

The invention will now be described in more detail by way of an example of an application.

Figure 1A:
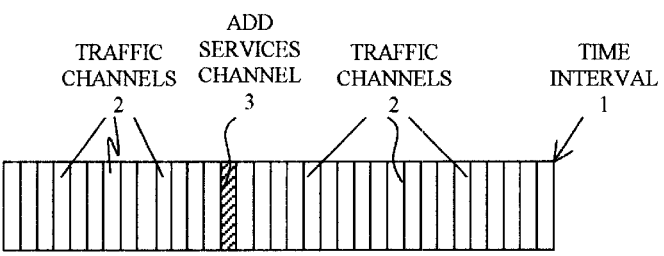
FIG. 1A shows an example of a channel allocation according to the invention.

A primary feature of the invention is that the additional services which are to be transferred through the network are grouped in a common channel. For the transfer over the radio link hop, the channel can be time divided (fixed time slots in the transmission), frequency divided or transferred in another manner. An example of time divided transmission is shown in FIG. 1A.

In the figure there is shown a time interval 1. During this time interval a number of commercial traffic channels 2 are transferred while the interval 3 is reserved for the common channel of the additional services.

Figure 1B:
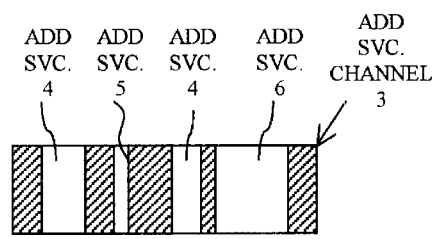
FIG. 1B shows in a time expanded manner how the additional services use the common channel.

FIG. 1B shows the interval 3 time expanded. According to the example shown, information from three various additional services, denoted 4, 5 and 6, are transferred during this interval.

Further characterizing the invention is the fact that the common channel is not allocated in advance to any particular type of services, but can be used by all available additional services. The information from the various additional services is therefore converted to packets which are brought together in the common channel and which thereafter are transported via the radio link hop. This results in the following advantages compared to earlier known systems:

Only one type of transport system needs implementing irrespective of how many and which types of additional services that shall be used.

Since the transport channel for the additional services is a common resource, it can be used maximally by one or several services depending upon the present need. This provides a more effective use of the radio link.

If a service is to be incorporated or removed, no redesign of the transport system is necessary. Neither will forthcoming services with unknown requirements result in the design having to be changed as long as spare capacity is available in the common transport channel.

Further in accordance with the invention, the additional services will not be terminated in every radio link station, but instead only at the locations where they shall be used. This means that in the cases when the radio link stations are connected with a permanent circuit network, all additional services in the common channel can be transferred in a single cabling that connects all radio link terminals on site. Accordingly the information is transmitted through the common cabling to a suitable receiver to be transported over a radio link hop, via next common cabling etc. until it has reached the correct addressee. Not until then is an adaption of the additional service made to correct logical, electrical and physical format for each user. In this way a number of advantages are achieved e.g.

termination of additional services is only made on the locations where the service will be used, which saves the cost for the equipment otherwise necessary in each terminal.

the cabling becomes uniform and simple as only one physical connection is necessary to transfer all additional services.

the system is simple to modify since no changes to the physical cabling of the system is necessary if one wishes to move the terminating point for a service, only the information is rerouted to the new destination.

it is simple to incorporate new additional services without the other parts of the installation being effected since, when the terminating points for the new service are installed, the existing transport system can be used without the need for changes.

if the radio link network has been designed so that redundant (alternative) routes are present between starting point and ending point, this can be utilized to provide a safe transport service without requiring additional equipment for redundance switching of the network since the strategy chosen for routing of information can reroute the information via spare routes by means of known methods.

To further explain the invention, an embodiment in which the invention has been applied to the transportation of information between two analogous additional services such as service telephones, will now be described.

When describing information transfer in networks the commonly known OSI-model (Open Systems Interconnection) which comprises seven various layers, is often used. In the following example the three lowest layers will be dealt therefore be briefly described.

On the highest of the three layers, the network layer, all functions that deal with data distribution (routing), monitoring and controlling of the quality and capacity of the transmission, spare channels etc, are located. The network layer also provides the additional services with a transport system between the terminating points.

The purpose of the next layer, the data link layer, are to provide the network layer with a transport channel through the media. Typical functions for the data link layer is synchronization, delimiting of data fields, establishing and releasing connections, error detection and flow control.

The lowest level, the physical layer, defines how the terminating ends of the transfer media (e.g. cable, radio link) are connected (mechanically and electrically), data representation, error checks etc.

Figure 2:
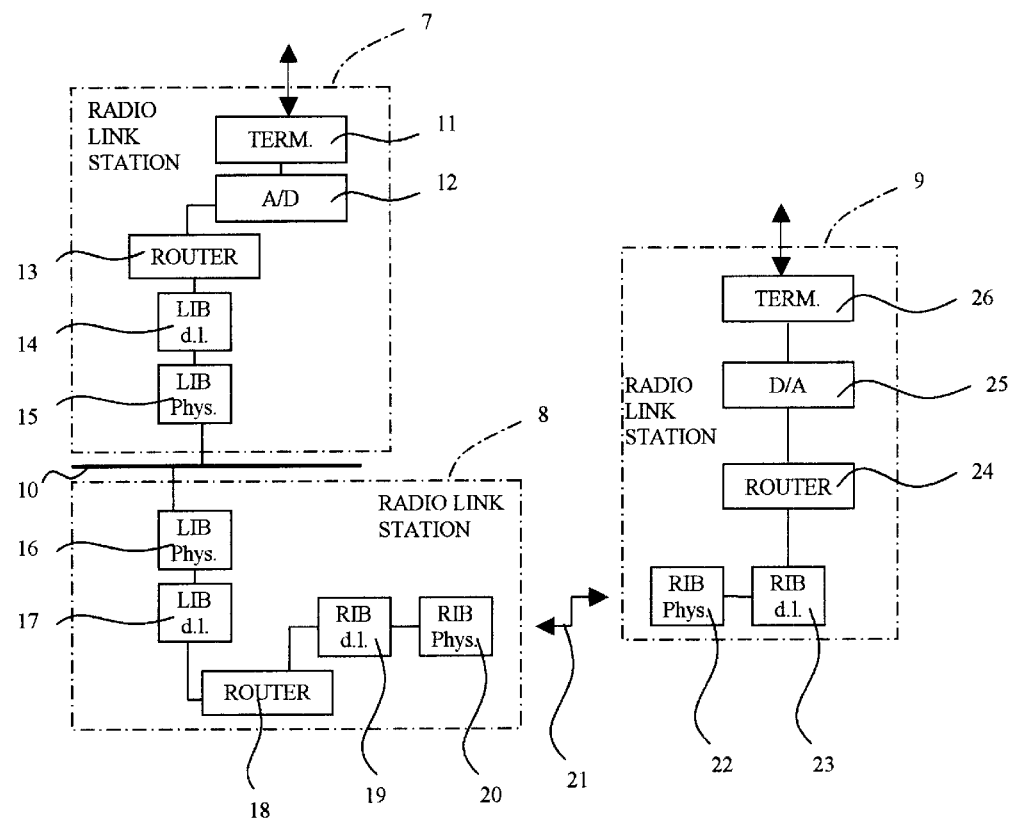
FIG. 2 shows an example of a radio link network according to the invention.

In FIG. 2 three different radio link stations, denoted 7, 8 and 9, are schematically shown. Between the stations 7 and 8, which are assumed to be located comparatively close to each other, the information is transferred in a permanent circuit network whilst the transfer between the stations 8 and 9 is made via a radio connection.

On the physical layer 11 the said service telephone ("the additional service") is connected via terminating units. The terminating units adapt the connected additional service physically and electrically to the transport system. Since the additional service is an analogous voice channel, which means a continuous data flow, the terminating units will, after conversion to digital 12, split the continuous flow and as "packets" transfer these to the routing function 13 in the network layer. In the receiving direction the packets will, when they are received, be converted to a continuous analogous information flow. For services that generate discontinuous data flows, the terminating units will, in addition to physically adapting the information to the user's inputs and outputs, also adapt the size of packets and transmission speed before they are transmitted further on to the routing function.

As mentioned earlier, the routing function 13 is a central function in the network layer. The purpose of it is, among other things, to route the packets via a suitable route to their destinations. Within this function there can also be sub-functions, the purpose of which are to ensure that the terminating units are provided with the correct amount of data (flow control), to avoid that the radio link be choked with information in the event of over-load and to keep the transfer errors at a prescribed level. The function also brings the packets from other (here not mentioned) additional services together to the reserved channel, common for the additional services.

The routing function routes the packets from the additional services to a local information bus (LIB), the data link layer 14 and physical layer 15 of which transfer the information via a cabling 10 to the radio link station 8.

The purpose of the local information bus LIB is to transport the information from the additional services between radio link stations at the same location. The information transported by LIB arrives in the form of packets, the contents of which are defined by the service which sent the packet. In LIB there are included functions to obtain access to the physical bus, to transmit packets to one or several addressees, to await receipts, to take care of possible retransmissions. Also functions like splitting of big packets into several minor ones, detection and removal of faults, flow control and algorithms to avoid over-load may be included. LIB can be realized with the aid of a standardized bus e.g. IEEE 802.3 (Ethernet) or IEEE 802.5 (Token-Ring).

In the same way as in radio link station 7, the routing function 18 of the radio link station 8 transfers the packets from LIB to a radio information bus RIB. The data link layer 19 and the physical layer 20 of the RIB transfer the packets of the additional service via the radio connection 21 to the physical layer 22 and the data link layer 23 of RIB in the radio link station 9.

The purpose of the radio information bus RIB is to transport data from a transmitter to one or several receivers and to receive and to forward the information. RIB typically uses about 5% of the total transport capacity of the radio link. This resource is then used by all the additional services that will be transported through the channel.

RIB is transparent with respect to the information to be transferred, which means that RIB does not affect or change the information. New services can therefore be introduced and thereafter installed by the user. The data link layer packs the information from the network layer in packets, adds the information which may be needed for the radio hop (address, control information, check sum etc) and hands over the packet to the physical layer.

In the physical layer, start and end of the packet is identified by means of pointers, alternatively unique bit patterns or any other suitable method.

The physical layer of RIB distributes the bits of the transmitted data flow into the positions which are allocated for this type of information and includes the functions necessary for the transmitted information to be recovered in the receiver. In the receiver the information concerning the additional service is separated from other information. If information from several additional services is transferred, a separation of the other additional services which shall be terminated is made in a corresponding way, while the remaining additional services are forwarded to the next radio link station.

The routing function 24 in the radio link station 9 routes the information packets of the additional services further to the terminating units of the station where they are converted 25 to analogous form and are adapted 26 physically and electrically so that the additional service (the service telephone) can be connected.

The invention has been described by way of an example of an embodiment in which only one additional service has been dealt with. However it is obvious from the description that the invention also can be applied to cases with several additional services.

Further embodiments of the invention are of course possible within the scope of the appended claims.

What is claimed is:

1. In a radio link network in which information is transferred in a plurality of channels and which comprises a plurality of radio link stations, a method of transferring other traffic, in addition to commercial traffic, the other traffic being information from a number of various types of network operator support services which provide operational support, comprising the step of;

transferring the network operator support services in a common channel able to transfer a number of various types of network operator support services information;

splitting the information from the additional services into packets after physical and electrical adaptation to the radio link network, and transferring the packets from the various additional services in the common channel during different time intervals;

wherein the information from the network operator support services is transferred in the common channel between a starting radio link station and an ending radio link station through at least one intermediate radio link station without being terminated or adapted in an intermediate radio link station.

2. A radio link network in which information is transferred in a plurality of channels, comprising:

a plurality of radio link stations in which, in addition to regular commercial traffic, other traffic in the form of information from a number of various types of network operator support services which provide operational support is transferred from a starting radio link station through at least one intermediate radio link station to an ending radio link station without being terminated or adapted in on intermediate radio link station, wherein the radio link stations each include:

a terminating unit, at a starting radio link station for a particular network operator support service among the network operator support services, for physically and electrically adapting the information from the respective additional service to the radio link network and for splitting that information into packets;

a controller for bringing packets from the various types of network operator support services together in a common channel arranged in each radio link station, the common channel being for transferring information of the various types of network operator support services; and a terminating unit, at an ending radio link station for the particular network operator support service among the network operator support services, for converting the information to a predetermined physical and electrical format.

3. The radio link network of claim 2, wherein the packets from the various additional services are transferred in the common channel during different time intervals.

4. The radio link network of claim 2, wherein, when two of the radio link stations are connected via a permanent cable network, the transfer of the common channel between the radio link stations is made via a local information bus using a common cable between the two radio link stations.

5. In a radio link network in which information is transferred in a plurality of channels and which comprises a plurality of radio link stations, a method of transferring other traffic, in addition to commercial traffic, the other traffic being information from a number of various types of network operator support services which provide operational support, comprising the step of:

transferring the network operator support services in a common channel able to transfer a number of various types of network operator support services information, wherein the step of transferring further comprises converting tie various types of network operator support services into packets for transfer in the common channel, wherein the common channel is not allocated to any one particular type of support service;

wherein the information from the network operator support services is transferred in the common channel between a starting radio link station and an ending radio link station through at least one Intermediate radio link station without being terminated or adapted in an intermediate radio link station.

6. The radio link network of claim 2, wherein the common channel is not pre-allocated to any one particular type of support service.

7. In a radio link network in which information is transferred in a plurality of channels and which comprises a plurality of radio link stations, a method of transferring other traffic, in addition to commercial traffic the other traffic being information from a number of various types of network operator support services which provide operational support, comprising the step of:

transferring the network operator support services in a common channel able to transfer a number of various types of network operator support services information;

wherein the information from the network operator support services is transferred in the common channel between a starting radio link station and an ending radio link station through at least one intermediate radio link station without being terminated or adapted in an intermediate radio link station, and wherein the network operator support services information provides operational support and maintenance for the operator equipment and services for communication between operators.

8. The method of claim 7, wherein the network operator support services information is provided intermittently.

9. The radio link network of claim 2, wherein the network operator support services information provides operational support and maintenance for the operator equipment and services for communication between operators.

* * * * *